United States Patent
Feng et al.

(10) Patent No.: US 12,015,547 B2
(45) Date of Patent: Jun. 18, 2024

(54) METHOD OF AND AN ARRANGEMENT FOR COMMUNICATING BY A SERVER WITH A NODE DEVICE OF A NETWORK OF INTERCONNECTED NODE DEVICES

(71) Applicant: SIGNIFY HOLDING B.V., Eindhoven (NL)

(72) Inventors: Lei Feng, Shanghai (CN); Changjie Wang, Shanghai (CN); Jaya Karthik, Bangalore (IN); Ronny Andreas Antonius Maria Jacobs, Reading, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 55 days.

(21) Appl. No.: 17/634,255

(22) PCT Filed: Jul. 20, 2020

(86) PCT No.: PCT/EP2020/070433
§ 371 (c)(1),
(2) Date: Feb. 10, 2022

(87) PCT Pub. No.: WO2021/028155
PCT Pub. Date: Feb. 18, 2021

(65) Prior Publication Data
US 2022/0321462 A1     Oct. 6, 2022

(30) Foreign Application Priority Data

Aug. 14, 2019   (WO) ................ PCT/CN2019/100664
Nov. 19, 2019   (EP) ..................................... 19209929

(51) Int. Cl.
*H04L 45/00*   (2022.01)
*H04L 45/12*   (2022.01)
*H04L 45/24*   (2022.01)

(52) U.S. Cl.
CPC ............ *H04L 45/32* (2013.01); *H04L 45/124* (2013.01); *H04L 45/20* (2013.01); *H04L 45/24* (2013.01)

(58) Field of Classification Search
CPC ................. G06F 16/2471; G06F 16/27; G06F 16/24535; G06F 11/1076; G06F 16/951;
(Continued)

(56) References Cited

U.S. PATENT DOCUMENTS 6,987,847 B1 * 1/2006 Murphy ................. H04L 51/04
                                                     379/201.1
8,077,712 B2   12/2011 Evans
(Continued)

FOREIGN PATENT DOCUMENTS

WO   WO-2018145768 A1 *  8/2018  ........ H04W 52/0229

*Primary Examiner* — Djenane M Bayard (57) ABSTRACT

A method (50) of and an arrangement for communicating, by a server, with a target node device in a network of operatively interconnected node devices, wherein each node device of the network comprises a first communication interface for direct wireless communication with the server, and a second communication interface for inter-node device communication. The server determines (51) a current communication status of a target node device based on a last received uplink message of the target node device, prior to initiating message exchange with the target node device. The server then may communicate directly (52) with the target node device via the first communication interface, or via at least one other or delegate node device of the network selected by the server (53).

19 Claims, 3 Drawing Sheets

(58) Field of Classification Search
CPC ............ G06F 16/2379; G06F 11/3006; G06F 16/90335; G06F 8/65; G06F 16/24554; G06F 16/2465; G06F 21/6218; G06F 2221/2141; G06F 11/3086; G06F 16/2358; G06F 16/2425; G06F 16/335; G06F 11/3476; G06F 16/24568; G06F 3/04842; G06F 16/1734; G06F 16/901; G06F 9/45558; G06F 16/278; G06F 21/10; G06F 21/577; G06F 11/079; G06F 11/3034; G06F 16/21; G06F 21/64; G06F 11/0727; G06F 11/0769; G06F 11/0778; G06F 11/1092; G06F 11/3072; G06F 11/321; G06F 11/3419; G06F 11/3485; G06F 16/24545; G06F 16/2455; G06F 21/554; G06F 2201/835; G06F 2211/1028; G06F 2221/2113; G06F 16/182; G06F 16/2228; G06F 16/2322; G06F 16/9535; G06F 21/32; G06F 21/602; G06F 40/205; G06F 11/00; G06F 11/08; G06F 11/1464; G06F 16/211; G06F 16/435; G06F 16/9024; G06F 21/33; G06F 21/51; G06F 21/60; G06F 21/62; G06F 2201/81; G06F 2221/031; G06F 2221/2137; G06F 3/0604; G06F 9/4881; G06F 9/5072; G06F 16/176; G06F 16/1787; G06F 16/2477; G06F 16/273; G06F 2009/45595; G06F 2201/84; G06F 2201/86; G06F 3/0644; G06F 3/065; G06F 3/067; G06F 7/5324; H04W 4/029; H04W 84/18; H04W 4/02; H04W 8/24; H04L 67/12; H04L 67/125; H04L 67/1097; H04L 67/52; H04L 67/303; H04L 67/535; H04L 67/34; H04L 27/2626; H04L 27/2636; H04L 5/0007; H04L 5/0055; H04L 5/04; H04L 43/16; H04L 67/10; H04L 43/106; H04L 67/04; H04L 67/14; H04L 67/55; H04L 43/10; H04L 43/08; H04L 43/20; H04L 51/046; H04L 67/1095; H04L 67/56; H04L 69/14; H04L 1/0025; H04L 12/10; H04L 12/40; H04L 12/40039; H04L 12/413; H04L 12/46; H04L 12/4625; H04L 12/56; H04L 2012/40273; H04L 45/124; H04L 45/20

See application file for complete search history.

(56) References Cited

U.S. PATENT DOCUMENTS

| | | | |
|---|---|---|---|
| 8,515,500 B2 | 8/2013 | Das et al. | |
| 9,402,277 B2 | 7/2016 | Soliman | |
| 10,212,654 B2 | 2/2019 | Seed et al. | |
| 10,237,079 B2 | 3/2019 | Mani et al. | |
| 2008/0101316 A1* | 5/2008 | Del Signore | H04W 8/30 |
| | | | 370/342 |
| 2008/0109819 A1* | 5/2008 | Ahrens | H04W 4/02 |
| | | | 719/313 |
| 2012/0182867 A1* | 7/2012 | Farrag | H04J 3/16 |
| | | | 370/230 |
| 2015/0358777 A1 | 12/2015 | Gupta | |
| 2016/0007288 A1 | 1/2016 | Samardzija et al. | |
| 2017/0339536 A1* | 11/2017 | Lewis | H04W 4/80 |
| 2018/0286237 A1* | 10/2018 | Hu | G08G 1/146 |
| 2019/0296969 A1* | 9/2019 | Zimny | H04W 12/03 |
| 2019/0327319 A1* | 10/2019 | Gupta | H04L 67/145 |
| 2020/0275350 A1* | 8/2020 | Kodaypak | H04W 8/08 |
| 2020/0336895 A1* | 10/2020 | Bartlett | H04L 9/3247 |

* cited by examiner

┌─────────────────────────────────────────────┐
│ Determining current communication status of │──51
│ target node device based on last exchanged  │
│ message                                     │
└─────────────────────────────────────────────┘
                     │
┌─────────────────────────────────────────────┐
│ Communicating with target node device via   │
│ first communication interface if            │
│ communication status indicates availability │──52
│ for data exchange via first                 │
│ communication interface                     │
└─────────────────────────────────────────────┘
                     │
┌─────────────────────────────────────────────┐
│ Communicating with target node device via   │
│ at least one other node device if           │──53
│ communication status indicates              │
│ non-availability for data exchange via      │
│ first communication interface               │
└─────────────────────────────────────────────┘
                     │
┌ ─ ─ ─ ─ ─ ─ ─ ─ ─ ─ ─ ─ ─ ─ ─ ─ ─ ─ ─ ─ ─ ─ ┐
│ Receiving response from target node device  │──54
└ ─ ─ ─ ─ ─ ─ ─ ─ ─ ─ ─ ─ ─ ─ ─ ─ ─ ─ ─ ─ ─ ─ ┘
                     │
┌ ─ ─ ─ ─ ─ ─ ─ ─ ─ ─ ─ ─ ─ ─ ─ ─ ─ ─ ─ ─ ─ ─ ┐
│ Communicating with target node device via   │──55
│ first communicating interface               │
└ ─ ─ ─ ─ ─ ─ ─ ─ ─ ─ ─ ─ ─ ─ ─ ─ ─ ─ ─ ─ ─ ─ ┘
```

Fig. 3

Fig. 4 ns# METHOD OF AND AN ARRANGEMENT FOR COMMUNICATING BY A SERVER WITH A NODE DEVICE OF A NETWORK OF INTERCONNECTED NODE DEVICES

CROSS-REFERENCE TO PRIOR APPLICATIONS

This application is the U.S. National Phase application under 35 U.S.C. § 371 of International Application No. PCT/EP2020/070433, filed on Jul. 20, 2020, which claims the benefits of European Patent Application No. 19209929.9, filed on Nov. 19, 2019 and Chinese Patent Application No. PCT/CN2019/100664, filed on Aug. 14, 2019. These applications are hereby incorporated by reference herein.

TECHNICAL FIELD

The present disclosure generally relates to communication in a network of interconnected node devices or terminal devices, in particular, to a method of and an arrangement for communicating by a server with a node device in a network of interconnected node devices.

BACKGROUND

Customer-premises devices, such as lighting devices, Internet of Things, IoT, devices, and devices supporting enhanced Machine-Type Communication, eMTC, all of which comprising communication capabilities, are frequently deployed in communication networks comprised of a plurality of interconnected devices. These devices, generally called node devices or terminal devices, may comprise movable or mobile devices, operating with a wireless network connection, and/or stationary devices, having either or both a wired and/or wireless network connection.

The wired or wireless network node devices typically operate based on a first communication interface, such as a network adapter or a transceiver module, for data exchange with remote devices, such as a backend server, via a mobile communication system in a licensed frequency band, such as 2G/3G/4G/5G cellular communication, and other long-range wireless communication technologies like Long Range Wide Area Network, LoRaWAN, and Narrowband IoT, NB-IoT, for example.

Wireless networks comprised of communicatively interconnected node devices are also called networks in license exempt bands, such as Wireless Mesh Networks, WMNs, Wireless Personal Area Networks, WPANs, and proprietary wireless networks. Node devices may communicate data and messages to the remote backend server using the above-mentioned first communication interface. The second communication interface may be used for communication between node devices only, also called inter-node device communication.

Network protocols for exchanging data by networked devices or nodes may comprise ZigBee™, Bluetooth™, as well as WiFi based protocols for wireless networks, and wired bus networks such as DALI™ (Digital Addressable Lighting Interface), DSI (Digital Serial Interface), DMX (Digital Multiplex), KNX (and KNX based systems), and other proprietary networks, for example.

Communication with the node devices by a remote backend server is generally performed for control and management purposes, which often involves downlink messages sent via the first communication interface from the backend server to one or more of the node devices, for controlling operation of the node devices. However, sometimes a node device may appear unreachable to the backend server, due to various reasons, making it impossible for downlink messages from the server to reach a node device.

For example, when Network Address Translation, NAT, is used, for the purpose of conserving Internet Protocol, IP, address space, an IP address of a node device may be changed, making the device unreachable to the backend server that is not aware of the change of IP address of the node device.

On the other hand, some node devices, like many IoT devices, have resource constraints, such as a limited battery power, low throughput links and so on. These node devices normally may enter a sleep or inactive mode, which generally refers to a low power state, where some functional components or modules of the node device are switched off. As an example, a mobile phone switching to a low power mode will very often only maintain its telephone function and short message service, SMS, function active, while all other functions like 4G data connection will be switched off. In this case, as the data communication interface of the mobile phone is switched off, the mobile phone cannot receive downlink data messages, such as instructions or commands for controlling the mobile phone, communicated from a backend server. As a result, the mobile phone will appear unreachable to the server.

Various methods are proposed to overcome the above described problem. In one solution, the node device periodically creates and sends a certain type of uplink messages, such as heartbeat messages, to the backend server to maintain the downlink data or message channel alive. In another solution, for example, systems may use a cellular Short Message Service, SMS, to wake up the cellular data communication interface of the node devices, for receiving downlink messages.

With the transmission of heartbeat message, however, a large amount of data packages are transmitted due to a frequent transmission of such heartbeat messages, which will incur extra tariff costs and provide an increase in signaling load among the network. A typical heartbeat message interval to maintain the downlink reachable is, for example, 3 minutes, whereas such a network may comprise 30,000 or even more node devices. As for the SMS approach, some operators may not offer such service, especially for NB-IoT and eMTC communication.

U.S. Pat. No. 8,515,500 B2 discloses a system for conserving power in a client terminal device in a wireless system using a proxy device. The client terminal comprises a long-range primary communication interface for communication with a wireless access node of a communication network, and a short-range secondary communication interface to communicate with the proxy device. The client terminal may power-off its primary communication interface without giving notice to the access node. Prior to powering-off its primary communication interface, the client terminal may assign the proxy device to act as its proxy for monitoring a signaling/control channel of the access node. Upon detection of a message for the respective client terminal, the proxy device forwards the message to the client terminal via the secondary communication interface.

With this known system, when the client terminal device has powered-off its primary communication interface, the proxy device has to remain continuously active to avoid missing a downlink message communicated from the access node to the terminal device. Moreover, additional signaling is caused in the network by assigning the proxy device.

It is an object of the present disclosure to improve the communication between node devices operating in a network of operatively and communicatively interconnected node devices, and remote devices, such as a backend server device.

SUMMARY

The above mentioned and other objects are achieved, in a first aspect of the present disclosure, by a method of communicating between a server and a target node device operating in a network of operatively interconnected node devices, each node device comprising a first communication interface and a second communication interface, wherein the first communication interface is arranged for direct uplink, UL, and downlink, DL, wireless message exchange via a wireless communication system between the server and a node device, and the second communication interface is arranged for inter-node device communication between node devices in the network, wherein the server is arranged for keeping a record of a last exchanged message with each node device, the method comprising the steps of:
- determining, by the server, prior to communicating with the target node device, a current communication status of the target node device, based on the last message exchanged with the target node device;
- communicating, by the server, with the target node device, via the first communication interface of the target node device, if the determined communication status of the target node device indicates availability for data exchange via the first communication interface, and
- communicating, by the server, with the target node device, via at least one other node device of the network selected by the server, if the determined communication status of the target node device indicates non-availability for data exchange via the first communication interface.

The present disclosure provides an efficient communication solution that enables a remote server to reach a node device in the network whenever this node device is not reachable via a preferred direct, i.e. first communication interface between the server and the node device for exchanging data messages. If not reachable, the server selects another node device that is able to communicate with the server via its first communication interface and that is able to communicate with the target node device via the inter-node device enabled second communication interface, respectively. In this manner, the target node device can be reached by the server.

The disclosed solution is based on the insight that, prior to initiating a communication with a target node device via the first communication interface, a current communication status of a target node device can be determined by a remote server based on a last exchanged message with the target node device. That is either one or both of a last message transmitted by the server to the target node device, or a last message received by the server from the target node device.

With the proposed solution, from analysing information available from the message last exchanged with the target node device, such as a time-stamp, the server may determine a current communication status of the target node device, i.e. whether the target node device is potentially available for communication with the server over the first communication interface of the target node device knowing, for example, that a node devices will power-off its first communication interface after a certain time of inactivity.

In case the server determines that the target node device is potentially reachable, messages between the server and the target node device, such as control commands, are directly transferred over the first communication interface, being the most efficient and favourable way of communicating with the target node device.

On the other hand, when the target node device appears unreachable to the server, for example because the target node device has switched its first communication interface in an inactive or quiescent operational mode for power and/or cost saving purposes, communication with the target node device is established by the server via another or delegate node device and inter-node communication in the network.

Different from the prior art mentioned above, with the present solution, there is no need for a node device to appoint a proxy or other intermediate device for monitoring messages from the server when powering-off the first communication interface, for example. With the present solution, a node device can freely choose to operate in a communication mode same deems appropriate at any time, without worrying missing any message from the remote server, which is crucial to the proper operation of the node device.

The present disclosure thereby allows communication between a remote server and a target node device to be performed in a resource-efficient, timely and reliable manner, even when a target node device is not reachable for the server in case of addressing problems with the first communication interface. For example when the Internet Protocol, IP, address or another communication address of the first communication interface of the target node device known to the server has changed. In that case, a last message transmitted by the server to the target node device will either be bounced back as being non-deliverable and/or the server will not receive an acknowledgement message or other reply message from the target node device. Hence, from the transmission status of this last message exchanged, the server can decide on the communication status of the network node device.

With the present solution, the server itself greatly avoids sending directly messages via the first communication interface to a node device that is actually unreachable, thereby significantly reducing a number of unsuccessfully transmitted messages, such as control commands or instructions, which helps to save transmission channel resources, especially within a network having a large number of node devices.

As for a node device, same may operate either as a target node device or as another or delegate node device, selected by the server for re-establishing the connection to a target node device. This, depending on the communication status of the first communication interface of a respective node device, provided that the second communication interface for inter-node communication in the network remains available, i.e. in operation. In practice, the power required for data exchange via a (short-range) second communication interface is considerably less than for operating a (long-range) first communication interface. Further, the communication costs for data exchange via the (short-range) second communication interface is generally considerably less than for operating a (long-range) first communication interface.

The proposed solution also frees the node devices from sending frequent heartbeat messages for updating the backend server of their communication availability, i.e. to keep the first communication interface open all the time. The node devices may choose to communicate with the server only when necessary, or the node devices may choose to send heartbeat message less frequently compared to prior art systems. For example, instead of sending a heartbeat message every three minutes, with the present solution a heartbeat message may be send once in five hours or the like. The transmission interval for sending heartbeat messages may be made dependent on a regular message exchange rate between a respective node device and the backend server, for example.

That is, in case of a frequent message exchange between the server and a node device, the server generally will have stored a readily actual last exchanged message for determining the communication status of that node device, such that sending heart beat messages may be obsolete at all. It will be appreciated that in this manner the proposed solution significantly contributes in reducing data traffic over the communication channel(s) with the server, in particular in large networks having over 30,000 node devices, for example.

For a (mesh) network including a reasonable number of node devices, it can be contemplated that there is always at least one node device that has an active first communication interface, i.e. a first communication interface available for communicating with the server. That is, statistically speaking, there is always a node device that can function as the one other or delegate node device to be selected by the server for facilitating or resetting communication with a target node device that is not reachable via its first communication interface. In practice, a plurality of node devices will always be available to the server for communicating with a target device that is momentarily not directly reachable by the server. Hence, with the present solution, there is no particular need to appoint a specific node device keeping its first communication interface active or alive all the time, such as a proxy.

In an embodiment of the present disclosure, the record of a last exchanged message with each node device comprises a time stamp of the last exchanged message and at least one of an identification of the node device, an address of the node device, a geographical location of the node device, a delivery status of the message and type of the message.

In particular, wherein the communication status of the target node device is determined by the server to be non-availability for data exchange via the first communication interface when the last exchanged message with the target node device is exchanged at a point in time prior to a predetermined time period from determining the communication status by the server.

Assume a node device is set to power-off its first communication interface after 10 minutes of no data exchange activity on the first communication interface. From the timestamp indicating when the last message is exchanged with a respective node device, i.e. either a message transmitted to or received from the node device, the server can easily determine the current communication status of the first communication interface of the node device. That is, whether or not a target node device is potentially reachable via the first communication interface.

Even when the server does not know the exact duration of a non-activity time interval after which a node device powers-off its first communication interface, the server may validly assume that if a relative long time period has lapsed after the last message exchange, for example hours, days or even weeks, the first communication interface of a target node device most probably will not be accessible or reachable. Accordingly, based on the time lapsed after a last message exchange, the server may reliably determine the communication status of a target node device.

As mentioned a delivery status of messages and/or absence of acknowledgement message with the server may also be indicative for the communication status of a node device. It is noted that the term 'keeping a record of a last message exchanged' in accordance with the present solution may involve one or both a storage of the last message itself and storage of only metadata accompanying the message.

In an embodiment of the present disclosure, communicating, by the server, with the target node device, via at least one other node device comprises the step of transmitting, by the server, a downlink message to the at least one other node device, via the first communication interface of the at least one other node device, wherein the downlink message is of a type to be forwarded, by the at least one other node device via the second communication interface, to the target node device.

In this embodiment, the at least one other or delegate node device selected by the server operates as a relay device for forwarding a message from the server to the target node device. That is, the message destined to the target node device is transmitted from the server to the at least one other node device, and then forwarded from the at least one other node device to the target node device via the second communication interface for inter-node device communication.

The message to be forwarded may comprise a control command for operating the target node device, for example switching a lighting module on or off in the case of a node device comprising a lighting fixture, for example. In an embodiment of the present disclosure, the downlink message comprises an activation command or wake-up message for activating the target node device. That is, activating the target node device such that the first communication interface thereof is set in an operation mode for re-establishing message exchange with the server.

In an alternative embodiment of the present disclosure, communicating, by the server, with the target node device, via at least one other node device comprises the step of transmitting, by the server, a downlink message to the at least one other node device, via the first communication interface of the at least one other node device, wherein the downlink message comprises an instruction of requesting the other node device to transmit an activation command, via the second communication interface, to the target node device.

Different from the previous embodiment, wherein the delegate node device acts as a relay device for forwarding to the target node device a message or messages received from the server, in this alternative embodiment the delegate node device receives an instruction from the server to send an activation command to the target node device, activating the target node device such that the first communication interface thereof is set in an operation mode for message exchange with the server.

With this embodiment efficient used may be made of a particular communication protocol applied in the inter-node device communication between the node devices in the network.

For either of the above embodiments, the target node device may switch to an active mode. That is, the first communication interface of the target node device is made available for communication purposes and may transmit, in response, a message to the server via the first communication interface, reporting its alive status. Accordingly, when receiving, by the server, an uplink response message transmitted from the target node device, via the first communication interface, in response to receiving the activation command, optionally communication may be enabled by the server, with the target node device via the first communication interface of the target node device. Such as a transmission of control messages from the server to the target node device, over the first communication interface, being the most efficient way of communication between the server and the target node device.

In another embodiment of the present disclosure, the communication with the target node device, by the server, via the at least one other node device is performed according to either a single hop or a multi-hop protocol. That is, the other or delegate node device may communicate directly with the target node device via the second communication interface, i.e. single hop, or in case that the target node device is not close enough to the one selected other node device as to allow a direct communication via the second communication interface, the communication between the one other node device and the target node device may be completed via several intermediary node devices, i.e. multi-hop. The number of intermediate node devices may be limited, for example not more than five hops, to avoid signalling overflow in the network. An advantageous protocol for multi-hop transmission in the present solution is the known simple flooding routing algorithm.

For the purpose of ensuring secure transmission of the message exchange with the server and a target node device via another or delegate node device, in an embodiment of the present disclosure, the communication with the target node device, by the server, via the at least one other node device is performed according to a secure algorithm including at least one of data encryption, source validation and integrity check.

It will be appreciated that a server may operate a plurality of delegate node devices to reach a particular target node device. In an embodiment of the present disclosure, a number of the at least one other or delegate node devices is limited. In an example, at most five delegate nodes may be operated by the server. This, again, to avoid a data storm in the network at the level of the second communication interface and to save scarce communication resources at the level of the first communication interface.

The server may select the one or more other node devices based on different standards. In an embodiment of the present disclosure, the at least one other node device is selected by the server based on a geographical distance between the at least one other node device and the target node device. Shorter distance allows relatively faster and more efficient transmission of the message. Alternatively, the server can also select the at least on other node device based on geographical network locations of the at least one other node device and the target node device in the network. By way of example, the at least one other node device may be located in a same cell of a wireless network, which also helps to ensure more efficient transmission of the messages.

It can be contemplated that the server may also choose to transmit messages to a group of target node devices. In this case, in an embodiment of the present disclosure, the step of determining comprises determining a current communication status of the group of target node devices and the communicating steps are performed on each target node device of the group of target node devices. This allows, for example, to control multiple target node devices by the server at the same time.

In an exemplary embodiment of the present disclosure, the node devices comprise lighting fixtures, and the communicating comprises exchanging control commands for controlling lighting of the lighting fixtures. Controlling groups of target node devices may comprise, for example, switching of a group of lighting fixtures in a system of street lamps that are normally switched on and off once or twice a day.

In a second aspect of the present disclosure, there is provided a communication arrangement comprising a server and a network of operatively interconnected node devices, each node device of the network comprising a first communication interface and a second communication interface, wherein the first communication interface is arranged for direct uplink and downlink wireless message exchange via a wireless communication system between the server and a node device, and the second communication interface is arranged for inter-node device communication between node devices in the network, wherein the server is arranged for keeping a record of a last message exchanged with each node device, wherein the server is arranged for:
  determining, prior to communicating with a target node device, a current communication status of the target node device, based on the last message exchanged with the target node device;
  communicating, with the target node device, via the first communication interface of the target node device, if the determined communication status of the target node device indicates availability for data exchange via the first communication interface, and
  communicating, with the target node device, via at least one other node device of the network selected by the server, if the determined communication status of the target node device indicates non-availability for data exchange via the first communication interface;
wherein the at least one other node device is arranged for:
  receiving, from the server, via the first communication interface, at least one of:
    a message to be forwarded to the target node device, and
    an instruction for requesting transmission of an activation command to the target node device, and
  transmitting, to the target node device, via the second communication interface at least one of:
    a message received from the server to be forwarded to the target node device, and
    an activation command to the target node device.

The arrangement described above enjoys the same benefits and advantages as described in connection with the method in the first aspect of the present disclosure.

In a third aspect of the present disclosure, there is provided a computer program product comprising program code stored on a computer readable medium arranged for performing the method described in the first aspect of the present disclosure, when the program code is executed by at least one processor.

The above and other aspects of the present disclosure will be apparent from and elucidated with reference to the non-limitative example embodiment(s) described hereinafter.

DETAILED DESCRIPTION

The present disclosure is detailed below with reference to communication in a network of operatively interconnected node devices comprising lighting fixtures or lighting devices. Those skilled in the art will appreciate that the present disclosure is not limited to communication between node devices comprising lighting fixtures, but is equally applicable for communication with a wide variety of node devices enabled with data communication capabilities.

Throughout the description, the communication status of a node device is referred to as being unreachable for a remote or backend server when the first communication interface of the node device for direct communication with the server is in an inactive, sleep or power saving mode or even switched off, i.e. at least not in operation for receiving direct, i.e. downlink, DL, communication from the server. Further, the communication status of a node device is also referred to as being unreachable when the server cannot reach a node device caused by an incorrect or changed downlink data communication address of the node device, or the like.

Figure 1:
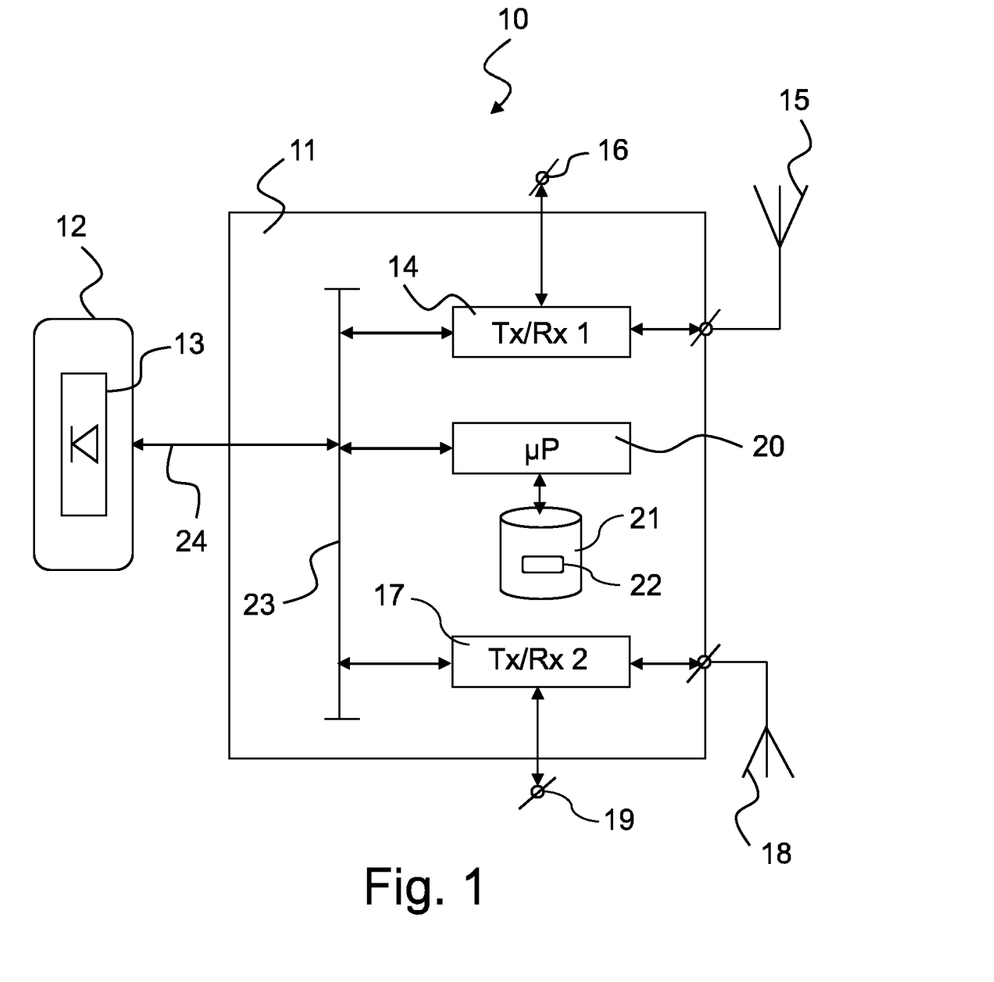
FIG. 1 illustrates, schematically, a diagram of an embodiment of a node device or terminal device arranged for operating in a network of operatively interconnected node devices, in accordance with the present disclosure.

FIG. 1 illustrates, schematically, a block diagram of an embodiment of a node device 10 arranged for operation in a network of operatively interconnected node devices, in accordance with the present disclosure.

The node device 10 comprises a control part or control device 11 and a lighting fixture or lighting device 12, comprising a lighting module 13, preferably a Light Emitting Diode, LED, lighting module or a plurality of LED lighting modules, operation of which may be controlled by the control device 11 from or through a remote control device, such as a remote or backend server (not shown), for example.

The control device 11 further comprises a first communication interface 14, such as a network adaptor or a transceiver, Tx/Rx 1, module, arranged for direct wireless message exchange or data packets 15 with such remote control device or backend server. The first communication interface 14 typically operates according to a mobile communication system technology in a licensed frequency band, such as 2G/3G/4G/5G cellular communication, and other long-range wireless communication technologies, such as known as Long Range Wide Area Network, LoRaWAN, and Narrowband IoT, NB-IoT, communication, for example. However, the first communication interface 14 may also operate according to a proprietary wireless communication protocol or technology.

The expression 'direct wireless message exchange' refers to downlink, DL, exchange of data via the first communication interface 14 over a wireless communication channel from a remote server to the node device 10, and uplink, UL, exchange of data via the first communication interface 14 from the node device 10 to the remote server, or the like.

The first communication interface 14 may be arranged for wired message exchange 16, such as for data exchange over an Ethernet connection or the like.

The control device 11 further comprises a second communication interface 17, such as a network adapter or transceiver, Tx/Rx 2, module arranged for short-range wireless 18 or wired 19 exchange of messages or data packets with another node device in the network, i.e. so called inter-node device communication. Network protocols for exchanging data by networked devices or nodes may comprise ZigBee™, Bluetooth™, as well as WiFi based protocols for wireless networks, and wired bus networks such as DALI™ (Digital Addressable Lighting Interface), DSI (Digital Serial Interface), DMX (Digital Multiplex), and KNX (or KNX based systems), and other proprietary protocols.

The control device 11 further comprises at least one microprocessor, µP, or controller 20, and at least one data repository or storage or memory 21, among others for storing computer program code instructions for operating the node device in accordance with the present disclosure, address information of the node device itself and other node devices, such as identifiers, IDs, Media Access Control, MAC, addresses and subscriber information of node devices. Instead of the repository 21, a separate memory or storage accessible to the at least one processor or controller 20 may be provided.

The at least one microprocessor or controller 20 communicatively interacts with and controls the first communication interface 14, the second communication interface 17, and the at least one repository or storage 21 via an internal data communication and control bus 23 of the control device 11. The first and second communication interfaces 14, 17 may be arranged for transferring/forwarding messages and data received by the node device 10 via the first communication interface 14 to another node device via the second communication interface 17.

The lighting fixture or lighting device 12 connects 24 to and is controlled from the data communication and control bus 23 by the at least one microprocessor or controller 20.

The second communication interface 17 is arranged for being active all the time, i.e. continuously staying in operation for receiving and transmitting inter-node communication messages, even when the node device 10 switches to a power saving or inactive mode, wherein some functional components or modules of the node device 10 are switched off, for example, among which the first communication interface 14, as a result of which direct communication between the node device 10 and a remote or backend server is not possible, i.e. the node device 10 is unreachable for a remote or backend server. Hence, via the second communication interface 17 inter-node device communication remains possible.

Figure 2:
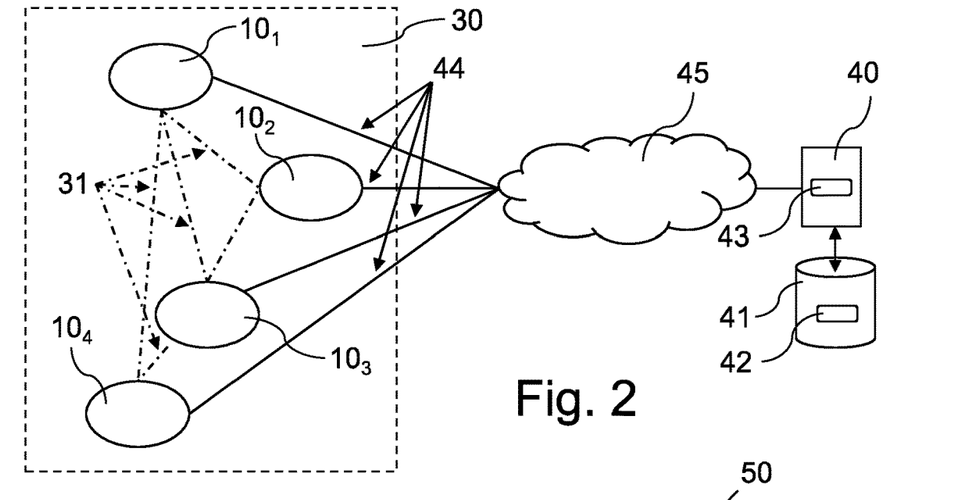
FIG. 2 illustrates, schematically, an arrangement comprising a network of interconnected node devices as illustrated in FIG. 1 and a backend server, connected to the node devices via a wireless communication system, in accordance with an embodiment of the present disclosure.

FIG. 2 illustrates, schematically, an hybrid communication arrangement, comprising a network 30 of a plurality of operatively and communicatively connected node devices 10, individually referred to as $10_1$, $10_2$, $10_3$, and $10_4$. Each node device 10 of the network 30 adopts a dual communication interface structure as described with reference to FIG. 1. That is, each node device 10 is arranged for direct message exchange 44—by its first communication interface 14—with a backend server 40 and a wireless communication system 45, such as a cellular communication system or a network using other long-range wireless communication technologies, as disclosed above. Reference numeral 43 refers to a communication interface of the server 40 arranged for communication over the wireless communication system 45, comparable to the first communication interface of a node device 10, as elucidated above.

The node devices 10 are arranged and connected for inter-node device communication by their second communication interfaces 17, illustrated by dash-dot lines 31. For simplicity sake, only four node devices 10 are shown in FIG. 2. In practice, however, the network 30 may comprise a large number of node devices 10, such as 30,000 or more, which may occupy a relatively large geographical area, such as lighting fixtures 12 mounted on lighting poles across a city or town.

In operation, each node device 10 transmits UL messages in a random fashion and/or time to the server 40, such as status data messages, acknowledgement of receipt messages, and heartbeat messages, for example. The server 40, in operation, the server 40 transmits DL control data messages to a node device 10.

The server 40 keeps a record 42 of UL and/or DL messages last received/transmitted from/to a respective node device $10_1$, $10_2$, $10_3$, $10_4$ in a database or storage or memory 41 accessible from the server 40.

In an embodiment of the present disclosure, the record 42 of a last exchanged message with a node device 10 comprises a time stamp of the last exchanged message and at least one of an identification of the node device 10, an address of the node device, and a geographical location of the node device.

Table 1 illustrates exemplary records 42, maintained by the server 40, of last received UL messages from several node devices 10 via the wireless communication system 45.

TABLE 1

Exemplary records of last received UL messages from node devices

| Device ID | Device address | Device location | Time of last received uplink message |
|---|---|---|---|
| 0001-2345-6789-0123 | 192.168.1.25 | 31.163868, 121.389519 | 1546999809077 |
| 0001-2345-6789-0124 | 192.168.1.26 | 31.163999, 121.389920 | 1546999999022 |

For each node device 10, table 1 comprises an identification of the node device, Device ID, which may be an arbitrary number, a device MAC address, an International Mobile Subscriber Identity, IMSI, or the like, a communication address of the first communication interface 14 of the node device, Device address, such as an Internet Protocol, IP, number IPv4, IPv6, mobile subscriber number, a geographic location of the node device, Device location, for example expressed in latitude and longitude coordinates of a geographic coordinate system, and time stamps of an uplink message last received from the node device 10, Time of last uplink message, in units of one millisecond, msec. or any other clock time related reference or unit.

In addition to or as an alternative of the time stamp referring to the last received uplink message, the record 42 may also comprise a time stamp referring to the last DL message transmitted from the server 40 to a respective node device 10. Further, the record 41 may comprise a delivery status or type of a last message transmitted to a node device, for example.

In table 1 above, the record 42 comprises metadata referring to the message last exchanged. In accordance with the present disclosure, keeping a record of a last message exchanged may also comprise storage of the content of the last message.

Figure 3:
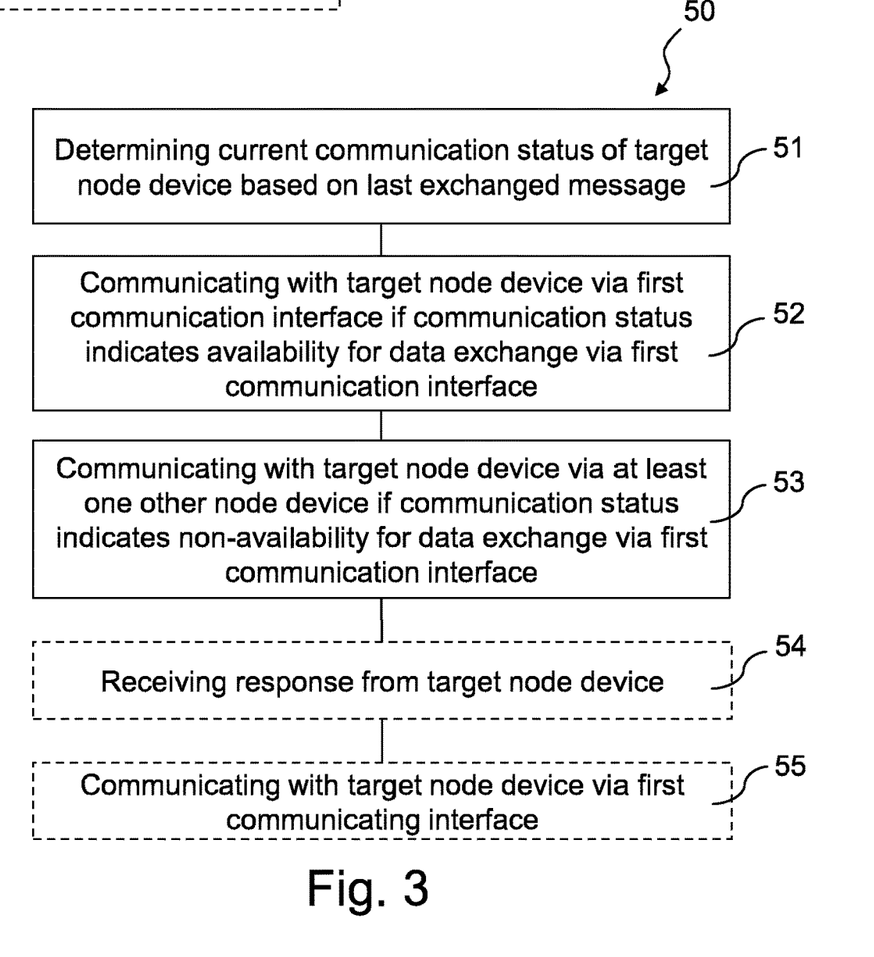
FIG. 3 illustrates, in a flow chart diagram, an example of detailed steps of a method of communicating with a node device by a server in accordance with the present disclosure.

FIG. 3 illustrates, in a flow chart, an example of detailed steps of a method 50 of communicating with a node device 10 by a server 40 in accordance with the exemplary record 42 shown in Table 1 above. It is assumed that the server 40 intends to exchange a message or messages with the node device $10_2$ in FIG. 2, also called the target node device, having the device ID 0001-2345-6789-0123. The current time, expressed in the notation of Table 1 is assumed to be represented by 1547002509077. Further, after 10 minutes of inactivity, the first communication interface 14 of a node device 10 becomes unavailable for communication, i.e. goes into sleep mode, or change of IP address, etc.

Prior to initiating message exchange by the server 40 with the target node device $10_2$ via the wireless communication system 45, the server 40 determines a current communication status of the target node device $10_2$ based on the current time and the time of the last receive UL message from the target node device $10_2$, i.e. step 51 "Determining current communication status of target node device based on last exchanged message".

For the node devices as illustrated in Table 1, a UL message from the target device 0001-2545-6789-0123 was last received by the server 2700000 units or msec., i.e. 45 minutes ago. Knowing the sleep mode cycle of the target node device $10_2$, the server 40 decides that the target node device is very likely unreachable via the communication system 45. That is to say, device 0001-2545-6789-0123 appears unreachable to the server 40.

Next, the server 40 determines whether at least one other node device 10 of the network 30 appears available for communication over the communication system 45. From checking the records 42 as shown in Table 1, it appears that the last UL message from node device 0001-2345-6789-9999, i.e. assume node device $10_3$ in network 30, is received 506732 msec. ago, i.e. less than 10 minutes ago. Hence, node device $10_3$ is most likely available and reachable via the communication system 45.

Accordingly, the server 40 determines that the target node device $10_2$ is available via inter-node device communication in the network 30 by the other node device $10_3$.

Hence, the server 40 selects the other node device $10_3$ as a delegate node device for exchanging a DL message with this other or delegate node device $10_3$ via the communication system 45 and the first communication interface 14 of this other node device $10_3$. That is step 53 "Communicating with target node device via at least one other node device if communication status indicates non-availability for data exchange via first communication interface".

The DL message exchanged by the server 40 with the delegate node device $10_3$ may comprise information indicating to the delegate node device $10_3$ to which target node device a message is to be transmitted, and optionally how the message should be transmitted. As an example, the DL message may comprise one of a node device identification designating a specific target node device $10_1$, a group identification for designating a group of node devices as target node devices, a type of the message to be transmitted to a target node device by the other node device, such as a broadcast message identification for indicating a broadcast message, etc.

Dependent on the type of DL message received from the server 40, the selected other node device $10_3$ may transmit or relay the received DL message from the server 40, or a separate message, such as an activation command, for waking up one or a plurality of the target node devices, via the inter-node device communication of the network 30, i.e. the second communication interfaces 17.

When the DL message received by the delegate node device $10_3$ comprise an activation command for waking up or reconnecting to the target node device $10_2$, the target node device $10_2$ may activate its first transmission interface 14 and optionally transmit a response UL message, such as an acknowledgement message, a heartbeat message, or any other message to the server 40 via the communication system 45, to indicate to the server 40 that it is available for direct communication via its first communication interface 14.

Upon receiving such an optional message from the target node device $10_2$ by the server 40, i.e. optional step 54 "Receiving response from target node device", the server 40, in step 55 "Communicating with target node device via first communicating interface", may start direct message exchange between the server 40 and the target node device $10_2$. Direct communication between the server 40 and the target node device $10_2$ is the most efficient way of communication in this case.

It is noted that a response message, transmitted by the target node device $10_2$ to the server 40, may include the actual device address of the target node device $10_2$ for communication over the first communication interface 14, such that the server 40 is always aware of the actual communication address of the target node device $10_2$. In this manner, the method according to the present disclosure is also suitable for establishing communication with a target node device if the server 40, in step 52, determines from a delivery status of the last exchanged message, i.e. the last message transmitted from the server 40 to the target node device $10_2$, that this last message has not been received by the target node device $10_2$, for example.

Those skilled in the art will appreciate that the server 40 does not necessarily has to be informed of a power-save or sleep mode cycle of a node device 10. The server 40 may maintain a default power-save or sleep mode cycle for determining the communication status of a target node device, for example.

Hence, with the method of the present disclosure, ineffective communication between the server 40 and a sleeping node device or otherwise not reachable node device is prevented, such that available communication resources in the communication system 45 are not inefficiently occupied.

The activation command to be transmitted from the delegate or other node device $10_3$ to the target node device $10_2$, or group of target node devices, may be comprised in the instruction from the server 40, or created, compiled or generated by the delegate node device $10_3$ based on the instruction received from the server 40. Traffic load over the network 30 may be reduced by transmitting relative simple and straightforward instructions between the node devices.

As mentioned above, the delegate node device $10_3$ may directly relay a message received from the server 40 via its first communication interface 14 over the inter-node communication interfaces 17, such as for example a command to switch-off or switch-on a lighting module 13 of a lighting fixture 12 controlled by the target node device $10_2$.

However, in some circumstances or scenarios it may be contemplated that the target node device $10_2$ communicates with the server 40 through the second communication interface 17 and the intermediate or delegate node device $10_3$, for example in case of malfunctioning of the first communication interface 14 of the target node device $10_2$.

It can be contemplated that the delegate node device $10_3$ and the target node device $10_2$ may communicate wirelessly 18, via their second communication interfaces 17, respectively, if their physical or geographical distance or network locations indicate that the node devices are in each other communication range. That is, the server 40 may select the delegate node device not only based on availability for message exchange over the communication system 45, but also on the bases of its geographical location or distance to the target node device $10_2$, based on the device location information included in the record 42, see Table 1.

On the other hand, in some scenarios, the target device cannot be accessed by all selected delegation devices because of the limited range of their inter-node wireless communication. As an example, from FIG. 2, it can be seen that between node device $10_4$ and node device $10_2$ no inter-node device communication is possible. When node device $10_4$ is selected by the server 40 as delegate node device for reaching the target node device $10_2$, from one or more of the address for communication and/or the geographical location of the target node device $10_2$, for example, the delegate node device $10_4$ may determine that a DL message received from the server 40 for forwarding to or instructing the target node device $10_2$ may require at least one intermediate node device. Such that the transmission of the DL message or a respective instruction from the server has to be performed based on a multi-hop or mesh protocol in the network 30.

In practice, any available multi-hop protocol, such as ZigBee, Bluetooth, and the like may be used. In practice, a known flooding routing algorithm is sufficient for the purpose of relaying or delegating a DL message from the server to a target node device.

In order to avoid a broadcast storm in the network 30 of the node devices, only a predefined limited number of hops, e.g. 5 hops can be executed for the DL message. The number of hops can also be dynamically adjusted based on, for example, the distance between the other node devices and the target node device.

Furthermore, each of the other node devices may forward a DL message only one time to avoid multiple delivery of the same DL message from different other node devices to a target node device.

It will be appreciated that the server 40 may operate a plurality of delegate node devices simultaneously, to reach a particular target node device. For the purpose of efficient use of scarce transmission resources in the communication system 45. In an example at most five delegate nodes are operated by the server 40. This, also to avoid a data storm in the network 30.

On the other hand, if in step 51 it is determined that a target node device is in a communication status for direct communication over the first communication interface 14, messages between the server 40 and with the target node device $10_2$ may be directly exchanged, i.e. step 52 "Communicating with target node device via first communication interface if communication status indicates availability for data exchange via first communication interface".

Those skilled in the art will appreciate that step 51 may be performed by the server 40 once at the start or initiation of a message train to a node device, such that this step 51 is not performed each time for e message in a particular sequence. Step 51 may also be performed by the server 40 only after a certain time interval has been lapsed since a last status check for a particular node device, such as the time interval after which the node device enters its sleep mode or power-save mode, or after a default time period, as mentioned above.

An example of a UL message is a heartbeat message. Heartbeat messages are typically sent periodically to a destination on a non-stop basis from an originator's start-up until the originator's shutdown. When the destination identifies a lack of heartbeat messages during an anticipated arrival period, the destination may determine that the originator has failed, shutdown, or is generally no longer available. On the other hand, the heartbeat message may maintain the mapping of the Network Address Translation, NAT, consistent. Therefore, a node device sending heartbeat messages to a server enables the server to determine when the node device fails communication or is no longer available. When the node is available, from the heartbeat messages, the server knows the address of a node device to directly communicate with via the first communication interface.

By way of example, in prior art applications, a typical heartbeat message interval in the mobile operator's cellular network may range up to three minutes. After three minutes, the downlink message cannot be accepted by the node device, as the node device's address is not valid anymore because of a time-out of NAT mapping, or the node device goes into sleep mode, for example.

Assuming that the network 30 in accordance with the present disclosure is a street light system that comprises 36,000 node devices, and the node devices have an uplink message interval of 5 hours, which is 18,000 seconds. A simple calculation shows that the server 40 will roughly get every 0.5 seconds an uplink message from a node device, such as a heartbeat message, for example. If the time-out period is three minutes as mentioned above, this means that on average there are always around 360 node devices with an active communication status and that can receive downlink messages from the server 40 at any time. These active node devices may serve as a candidate for operating as a delegate node device to be selected by the server 40.

In a network with fewer node devices, a heartbeat message rate of less than 5 hour might be necessary. Anyhow, comparable to prior art systems, with the present disclosure the heartbeat rate may be much less or even completely absent, dependent on the nature of the arrangement.

It will be appreciated by those skilled in the art that the UL message may be any message, as long as it can facilitate the server to determine a current status of the node device 10 sending the UL message.

For the purpose of having a reasonable system efficiency, it is not necessary for the server 40 to inquire all node devices of a network for operating as a delegate node device. The server 40 may select only such node devices meeting set transmission and capacity and processing criteria, such as so as to have a balanced and sufficiently efficient system performance.

As an example, the server may select a node device distanced from the target node device by a distance smaller than a threshold value. As another example, the selected node device and the target node device are in a same cell of a mobile network, for example.

It is noted that direct communication between the target node device and the server may be based on commercial networks such as a cellular communication network, which are generally more secure and robust than inter-node communication in the network between the node devices. Against this background, it may be considered that the second communication interface is used only for the transmission or forwarding of an activation command and not for relay of messages from or to the server.

On the other hand, secure transmission may be implemented for both a DL message from the server 40 to the delegate node device 10₃ and the (activation) message from the delegate node device 10₃ to the target node device 10₂.

Figure 4:
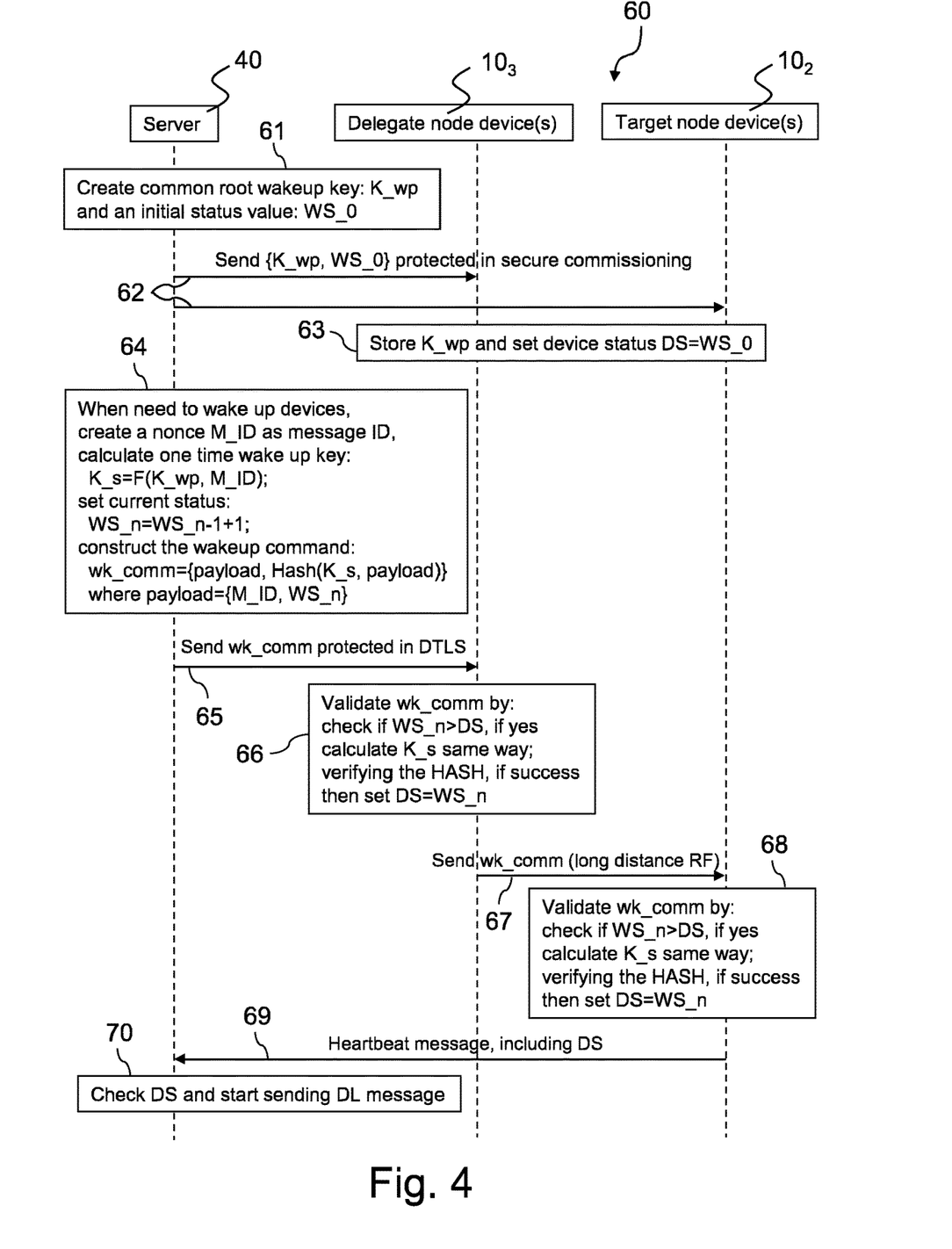
FIG. 4 illustrates, schematically, a secure transmission protocol applicable to the method of communication in accordance with the present disclosure.

FIG. 4 illustrates, schematically, a sequence of steps of a secure transmission protocol 60, applicable to the method of communication in accordance with the present disclosure. In FIG. 4, time runs from the top of the drawing to the bottom thereof.

The secure transmission proposed comprises two key parts, that is, source validation for validating whether the DL message is originated from the backend server 40, and an integrity check for the DL message. It is noted that the example as illustrated in FIG. 4 relates to a transmission protocol where the other or delegate node device or node devices 10₃ forward a wake-up message received from the server 40, to a target node device or a group of target node devices 10₂ without any further manipulation. Those skilled in the art will appreciate that the protocol may be adapted to a scenario where the delegate node device receives a first message from the server and then transmits a second message, different from the first message, to the target node device(s) which, however, will not be further elaborated here.

The protocol starts with step 61, "Create a common root wake-up key: K_wp, and an initial status value: WS_0", where the server 40 creates a root wake-up key to be used by all the node devices, including the delegate or active node device 10₃ and the target or inactive node device 10₂, and sets an initial status at zero, or any other random integer.

Next, at step 62, "Send {K_wp, WS_0} protected in secure commissioning", the created wake-up key and the initial status are sent to each node device 10₂ and 10₃, for example during commissioning of the node devices, ensuring secure transmission of the message.

At step 63, "Store K_wp and set device status DS=WS_0", the node devices store the received common wake-up key K_wp, and set their device status DS in accordance with the received initial status, that is DS=WS_0.

The above steps take place at an initialization stage of a network of node devices, for example, during the commissioning of lighting fixtures of a street light system including a vast plurality of streetlights or lamp posts.

Next, when the server 40 determines that a specific target node device 10₂ is inactive, and needs to be woken up, at step 64, the server 40 performs a number of operations to prepare an activation message, in this example a wake-up command, to be transmitted to the inactive target node device 10₂, via the active other or delegate node device 10₃. Specifically, the server 40 first creates a nonce M_ID, which is an arbitrary number, as the message ID. The server 40 then calculates, in accordance with a function F, a one-time wake-up key K_s=F(K_wp, M_ID), based on the root wake-up key and the message ID. Following that, the server sets the current status WS_n=WS_n−1+1, where n is the sequence number of the wake-up message. For example, for the first wake-up message (where n=1) send by the server 40, the current status will be calculated as: WS_1=WS_0+1. The last operation performed by the server 40 is to construct a wake-up command: wk_comm={payload, Hash(K_s, payload)}, where payload={M_ID, WS_n}, and Hash represents a hash function.

At step 65, "Send wk_comm protected in DTLS", the wake-up command created at step 64 is transmitted from the server 40 to the active or delegate node device(s) 10₃, via a Datagram Transport Layer Security, DTLS, protocol, which prevents the transmitted wake-up command from being eavesdropped, tampered or forged with. Alternatively, any other secure communication protocol may be applied, such as but not limited to Transport Layer Security, TLS, Internet Protocol Security, IPSec, etc.

At step 66, the delegate node device(s) 10₃, which function as a relay device for transmitting the received wake-up command wk_comm to the target node device(s) 10₂, checks whether the wake-up command is from a trustable source. Specifically, the target node device 10₃ first checks if WS_n is larger than the device status DS. In case WS_n>DS, the wake-up key is calculated based on the root wake-up key and the message ID, i.e. calculate K_s same way. The hash value in the received wake-up command is verified by re-hashing the wake-up key and the payload. Upon successful verifying the hash value, that is, the received wake-up command is verified to be from a reliable source, i.e. the server 40, the device status DS is set equal to the received current status DS=WS_n.

The verified wake-up command is transmitted, transferred or forwarded to the target node device(s) 10₂ at step 67. At step 68, the target node device 10₂ again validates whether the wake-up command is from a trustable source, by way of the same method as used by the delegate node device 10₃ at step 66.

After the wake-up command is validated and verified, the target node device 10₂ transmits a heartbeat message to the server 40 at step 69, informing the server 2 that it is now available for communication directly, i.e. Heartbeat message including DS. Then, at step 70, the server 2 now communicates with the target node device 10₂, now being active for direct communication with the server 40, by sending direct DL messages to the target node device 10₂.

It will be appreciated that an embodiment of the present disclosure may also be any combination of the dependent claims and/or the above embodiments and a respective independent claim.

Other variations to the disclosed examples can be understood and effected by those skilled in the art in practicing the claimed disclosure, from a study of the drawings, the disclosure, and the appended claims. In the claims, the word "comprising" does not exclude other elements or steps, and the indefinite article "a" or "an" does not exclude a plurality. A single processor or transceiver or other unit may fulfil the functions of several items recited in the claims. The mere fact that certain measures are recited in mutually different dependent claims does not indicate that a combination of these measured cannot be used to advantage. A computer program may be stored/distributed on a suitable medium such as an optical storage medium or a solid-state medium supplied together with or as a part of the hardware, but may also be distributed in other forms, such as via the Internet or other wired or wireless telecommunication systems. Any reference signs in the claims should not be construed as limiting the scope thereof.

The invention claimed is:

1. A method of communicating between a server and a target node device operating in a network of operatively interconnected node devices, each node device comprising a first communication interface and a second communication interface, wherein said first communication interface is arranged for direct uplink and downlink wireless message exchange via a wireless communication system between said server and a node device, and said second communication interface is arranged for inter-node device communication between node devices in said network, wherein said server is arranged for keeping a record of a last communication message successfully exchanged with each node device via the first communication interface, and wherein said last communication message excludes a heartbeat message, said method comprising:

determining, by said server, prior to communicating with said target node device, a current communication status of said target node device, wherein said current communication status is based on information in the record of said last communication message successfully exchanged with said target node device via said first communication interface;

communicating, by said server with said target node device, via said first communication interface of said target node device, if said determined current communication status of said target node device indicates availability for data exchange via said first communication interface; and communicating, by said server, with said target node device, via at least one other node device of said network selected by said server, if said determined current communication status of said target node device indicates non-availability for data exchange via said first communication interface, wherein the record for said target node device comprises a time stamp of the last successfully exchanged communication message, wherein said current communication status of said target node device is determined by said server to be non-availability for data exchange via said first communication interface when said last successfully exchanged communication message with said target node device is exchanged at a point in time prior to a predetermined time period from determining said current communication status by said server, and wherein the predetermined time period comprises a sleep mode cycle, known by said server, of said target node device.

2. The method according to claim 1, wherein said record of a last successfully exchanged communication message with a node device further comprises at least one of an identification of said node device, an address of said node device, a geographical location of said node device, a delivery status, and type of said last successfully exchanged communication message.

3. The method according to claim 1, wherein said late successfully exchanged communication message comprises an uplink message.

4. The method according to claim 1, wherein communicating, by said server, with said target node device, via at least one other node device comprises:

transmitting, by said server, a downlink message to said at least one other node device, via said first communication interface of said at least one other node device, wherein said downlink message is of a type to be forwarded, by said at least one other node device via said second communication interface, to said target node device.

5. The method according to claim 4, wherein said downlink message comprises an activation command for activating said target node device.

6. The method according to claim 4, further comprising:

receiving, by said server, an uplink response message transmitted from said target node device, via said first communication interface, in response to receiving said activation command; and communicating, by said server, with said target node device via said first communication interface of said target node device.

7. The method according to claim 1, wherein communicating, by said server, with said target node device, via at least one other node device comprises:

transmitting, by said server, a downlink message to said at least one other node device, via said first communication interface of said at least one other node device, wherein said downlink message comprises an instruction of requesting said other node device to transmit an activation command, via said second communication interface, to said target node device.

8. The method according to claim 1, wherein said communicating, by said server, with said target node device, via at least one other node device is performed according to one of a single hop and a multi-hop protocol, in particular wherein said multi-hop protocol is a flooding routing algorithm.

9. The method according to claim 1, wherein said communicating, by said server, with said target node device, via at least one other node device is performed according to a secure algorithm including at least one of data encryption, source validation and integrity check.

10. The method according to claim 1, wherein a number of said at least one other node device is limited, in particular, smaller than or equal to five.

11. The method according to claim 1, wherein said at least one other node device is selected by said server based on at least one of a geographical distance between said at least one other node device and said target node device, and geographical locations of said at least one other node device and said target node device in said network.

12. The method according to claim 1, wherein said determining comprises determining a current communication status of a group of target node devices, and said communicating are performed for each target node device of said group of target node devices.

13. The method according to claim 1, wherein said node devices comprise lighting fixtures, and said communicating comprises exchanging control commands for controlling lighting of said lighting fixtures.

14. The method according to claim 1, wherein said record is unchanged as a result of communicating via said at least one other node device of said network when said determined current communication status of said target node device indicates non-availability for data exchange via said first communication interface.

15. The method according to claim 1, wherein said sleep mode cycle of said target node device is unchanged after said server communicates with said target node device via said at least one other node device of said network selected by said server.

16. The method according to claim 1, wherein said sleep mode cycle of said target node device is estimated by said server.

17. The method according to claim 1, wherein said sleep mode cycle of said target node device is set by said target node device and communicated to said server.

18. A communication arrangement comprising a server and a network of operatively interconnected node devices, each node device of said network comprising a first communication interface and a second communication interface, wherein said first communication interface is arranged for direct uplink and downlink wireless message exchange via a wireless communication system between said server and a node device, and said second communication interface is arranged for inter-node device communication between node devices in said network, wherein said server is arranged for keeping a record of a last communication message successfully exchanged with each node device via said first communication interface, wherein said last communication message excludes a heartbeat message, wherein said server is arranged for:
determining, prior to communicating with a target node device, a current communication status of said target node device, wherein said current communication status is based on information in said record of said last communication message successfully exchanged with said target node device via said first communication interface;
communicating, with said target node device, via said first communication interface of said target node device, if said determined current communication status of said target node device indicates availability for data exchange via said first communication interface; and
communicating, with said target node device, via at least one other node device of said network selected by said server, if said determined current communication status of said target node device indicates non-availability for data exchange via said first communication interface,
wherein the record for said target node device comprises a time stamp of the last successfully exchanged communication message, wherein said current communication status of said target node device is determined by said server to be non-availability for data exchange via said first communication interface when said last successfully exchanged communication message with said target node device is exchanged at a point in time prior to a predetermined time period from determining said current communication status by said server, wherein said predetermined time period comprises a sleep mode cycle, known by said server, of said target node device,
wherein said at least one other node device is arranged for:
receiving, from said server, via said first communication interface, at least one of:
a second communication message to be forwarded to said target node device, wherein said second communication message excludes a heartbeat message, and
an instruction for requesting transmission of an activation command to said target node device, and
transmitting, to said target node device, via said second communication interface at least one of:
the second communication message received from said server, and
the activation command.

19. A non-transitory computer readable medium comprising computer readable program code executed by at least one processor, said computer readable program code arranged for performing a method of communicating between a server and a target node device operating in a network of operatively interconnected node devices, each node device comprising a first communication interface and a second communication interface, wherein said first communication interface is arranged for direct uplink and downlink wireless message exchange via a wireless communication system between said server and a node device, and said second communication interface is arranged for inter-node device communication between node devices in said network, wherein said server is arranged for keeping a record of a last communication message successfully exchanged with each node device via said first communication interface, and wherein said last communication message excludes a heartbeat message, said method comprising:
determining, prior to communicating with said target node device, a current communication status of said target node device, wherein said current communication status is based on information in said record of said last communication message successfully exchanged with said target node device via said first communication interface;

communicating, using said server with said target node device, via said first communication interface of said target node device, if said determined current communication status of said target node device indicates availability for data exchange via said first communication interface; and communicating, using said server, with said target node device, via at least one other node device of said network selected by said server, if said determined current communication status of said target node device indicates non-availability for data exchange via said first communication interface, wherein said record for said target node device comprises a time stamp of said last successfully exchanged communication message, wherein said current communication status of said target node device is determined by said server to be non-availability for data exchange via said first communication interface when said last successfully exchanged communication message with said target node device is exchanged at a point in time prior to a predetermined time period from determining said current communication status by said server, and wherein said predetermined time period comprises a sleep mode cycle, known by said server, of said target node device.

* * * * *